No. 695,573. Patented Mar. 18, 1902.
P. MAGNIER & P. A. BRANGIER.
PROCESS OF CONVERTING WOOD, WOOD SHAVINGS, &c., INTO DEXTRINE, GLUCOSE, AND ALCOHOL.
(Application filed Jan. 25, 1899.)
(No Model.)
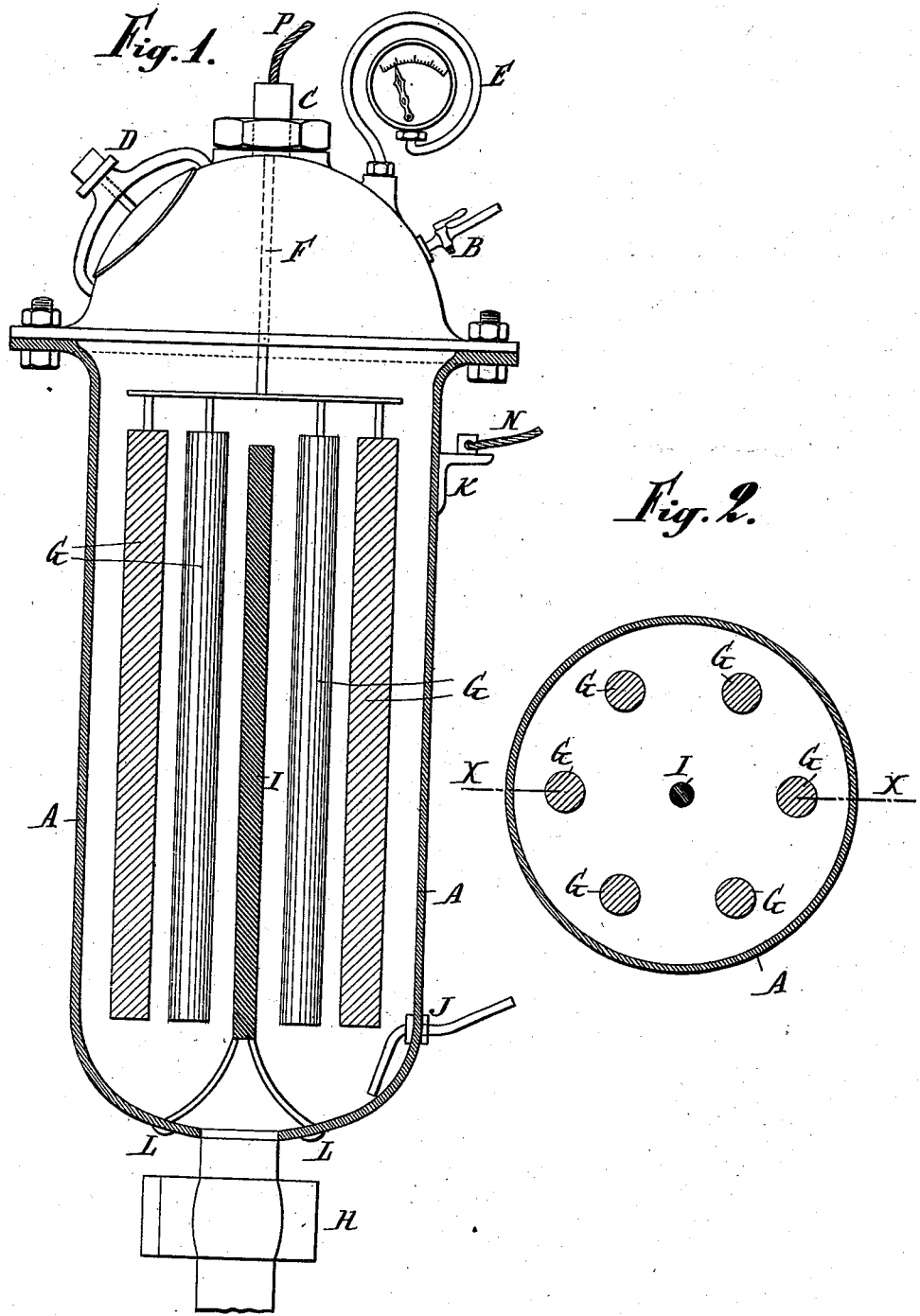

UNITED STATES PATENT OFFICE.

PAUL MAGNIER, OF BILLANCOURT, AND PIERRE ARMAND BRANGIER, OF ESTRÉES, FRANCE.

PROCESS OF CONVERTING WOOD, WOOD SHAVINGS, &c., INTO DEXTRINE, GLUCOSE, AND ALCOHOL.

SPECIFICATION forming part of Letters Patent No. 695,573, dated March 18, 1902.

Application filed July 25, 1899. Serial No. 725,086. (No specimens.)

*To all whom it may concern:*

Be it known that we, PAUL MAGNIER, chemist, a resident of Billancourt, and PIERRE ARMAND BRANGIER, industrial, a resident of Aux Estrées, par la Créché, France, citizens of the Republic of France, have invented a certain new Improved Process of Converting Wood, Wood Shavings, Woody Fiber, Sawdust, and other Substances into Dextrine, Glucose, and Alcohol, of which the following is a specification.

The present invention has for its object an improved process for obtaining dextrine, glucose, and ethylic alcohol by an inexpensive treatment of wood, woody fiber, shavings, and the like.

Various attempts have previously been made to convert cellulose, wood, and other like woody materials into glucose and, as final result, ethylic alcohol. It is sufficient to recall on this subject numerous academic works which have seen daylight and which nevertheless have up to now been so little satisfactory that the processes described in the works in question have never been capable of being exploited industrially. It is precisely this problem of a possible industrial exploitation for the economical conversion of cellulose into glucose and alcohol which we consider we have discovered, but not in its entirety—that is to say, it is not pretended that this improved process is a complete innovation in all its phases, but that it is characterized by certain electrogalvanic improvements or the use of any electric metallic element, as will be hereinafter specified.

The following is the method of carrying out our process.

In the event of hard wood and other raw material being used in which the cellulose is accompanied by a considerable quantity of foreign matter we commence by freeing the cellulose of such substances by the following preliminary treatment: The wood, reduced to small fragments, (shavings, sawdust, pulp, or the like,) is subjected at the temperature of boiling-point to the action of hypochlorite of calcium and hydrate of lime in water. It is maintained at boiling-point for an hour or two, according to the nature of the woody substance to be treated. At the end of the operation a little sulfuric acid is added until the liquid is slightly acid. The material thus treated, or the raw material itself, if it is not advisable to subject it to this preliminary treatment, is treated at a temperature of 100° centigrade with water acidulated by a mixture of about two per cent. (calculated on the raw materials subjected to the treatment) of sulfuric and phosphoric acids. When the material is deemed to be sufficiently attacked and disintegrated and when the presence of dextrine in the liquid is ascertained, the liquid and pasty substances are introduced in a closed digester, where they are heated to about 150° to 160° centigrade for some time, it being of course evident that the higher the temperature the shorter the operation. The liquid is then neutralized by introducing into the apparatus itself the necessary quantity of carbonate of calcium or barium, and if it be only desired to obtain dextroglucose there is added to the substance for the purpose of bleaching it water charged with sulfurous acid and a little zinc, which transforms the sulfurous anhydrid into hydrosulfurous acid, when the apparatus while closed is again heated for some time.

If instead of glucose alone it is intended to ultimately produce alcohol and the brown color of the liquid may be disregarded, it is useless, of course, to make use of the action of hydrosulfurous acid. It is then sufficient to pass a voltaic current into the liquid while under pressure in order to render the major part of the introverted substances capable of fermentation and to mix with the cellulose wort a little wort containing albuminoid substances (beet-root, grain, or the like) in order to obtain a maximum return. The current may be produced by immersing in the liquid a metallic element or couple—such as zinc and copper, for instance—which even in a neutral liquid, but the temperature of which exceeds 100° centigrade, furnishes a sufficient voltaic current, or even by utilizing for the same purpose an external voltaic current, (batteries, dynamo, or the like,) this second mode of operation having the advantage of avoiding the use of a temperature superior to 120° to 140° centigrade, while yielding the same result.

In all the foregoing description it has only been a question of converting cellulose substances, (woody fiber, shavings, and the like.) It is evident that electrolysis under pressure, which forms the essential principle of the process hereinbefore described, may be applied to all non-fermentable products capable of being thereby converted into fermentable sugar, and consequently into ethylic alcohol, without departing from the scope of the present invention.

The invention is illustrated in the accompanying drawings, in which—

Figure 1 is a central vertical section on line $x\,x$ of Fig. 2, the top of the digester being shown in elevation, while Fig. 2 is a horizontal section.

A is a digester; B, a cock for the outlet of steam; C, an insulating stuffing-box into which passes the cable P, supplying the positive electricity; D, a hole for introducing the cellulose; E, a steam-gage; F, a rod supporting the carbons through which passes the current; G, electric carbons forming positive electrodes of a diameter of 0.10 millimeter; H, an outlet-cock of the transformed material and of the glucose liquid; I, an interior rod of copper connected with the boiler at L and L. This rod has the purpose to increase the exchange of the negative electricity for which the entire boiler-shell serves as pole; J, the point where the steam arrives; K, the point where the negative current arrives, N indicating the lateral conductor.

We declare that what we claim is—

The herein-described process consisting in digesting wood, woody fiber, shavings and the like at 100° centigrade with water containing two per cent. of a mixture of sulfuric and phosphoric acids, then heating to a high temperature in a closed digester, neutralizing the material, passing an electric current through the material, while under pressure, then adding albuminoid substances to the material, and then fermenting and distilling the material, substantially as described.

In witness whereof we have hereunto set our hands in presence of two witnesses.

PAUL MAGNIER.
PIERRE ARMAND BRANGIER.

Witnesses:
ERNEST ANSEAUME,
LOUIS LUCIEN ROIDOT.